United States Patent [19]

McCrum

[11] 4,456,029
[45] Jun. 26, 1984

[54] TWO-WAY FUSE FOR A FLUID LINE

[75] Inventor: Russell C. McCrum, Maple Valley, Wash.

[73] Assignee: The Boeing Company, Seattle, Wash.

[21] Appl. No.: 357,473

[22] Filed: Mar. 12, 1982

[51] Int. Cl.³ .............................................. F16K 17/26
[52] U.S. Cl. .................................. 137/498; 137/516.25; 137/517; 137/543.15
[58] Field of Search ................... 137/498, 516.25, 517, 137/112, 543.15

[56] References Cited

U.S. PATENT DOCUMENTS

| | | | |
|---|---|---|---|
| 398,111 | 2/1889 | Abbot | 137/498 X |
| 701,754 | 6/1902 | Moran | |
| 1,466,171 | 8/1923 | Jacobsen | |
| 2,454,480 | 11/1948 | Rossman | 137/152 |
| 2,623,725 | 12/1952 | Sands | 251/118 |
| 2,889,850 | 6/1959 | Eberline | 137/514.5 |
| 3,017,871 | 1/1962 | McKiney | 123/25 |
| 3,085,589 | 4/1963 | Sands | 137/498 |
| 3,122,162 | 1/1964 | Sands | 137/498 |
| 3,326,233 | 6/1967 | Perruzzi | 137/460 |
| 3,683,957 | 8/1972 | Sands | 137/498 X |
| 4,104,004 | 8/1978 | Graef | 417/313 |
| 4,120,316 | 10/1978 | Robinson, Jr. et al. | 137/498 |
| 4,174,731 | 11/1979 | Sturgis | 137/498 |

FOREIGN PATENT DOCUMENTS 119162 3/1970 Norway ........................ 137/517

*Primary Examiner*—Robert G. Nilson
*Attorney, Agent, or Firm*—Delbert J. Barnard; Joan H. Pauly

[57] ABSTRACT

An axial flow passageway includes a bulbous chamber (8) that is circular in cross section and has a smoothly curved sidewall that blends into the fluid line in which the fuse (2) is installed. The cross-sectional diameters of the chamber (8) increase from a predetermined diameter at the inlet and outlet ends to a maximum diameter at an intermediate portion of the chamber (8). A circular plug (12) is concentric with the axis of the flow passageway and has a maximum diameter equal to said predetermined diameter. The plug (12) moves in the axial direction between an intermediate equilibrium position and first and second closed positions in which the plug's periphery seats against the sidewall of the chamber (8). In the equilibrium position, there is an annular flow passageway between said periphery and said sidewall. A spring (22) biases the plug (12) in its equilibrium position. Preferably, the plug (12) is free to move toward its second closed position, and the spring (22) is preloaded to oppose movement of the plug (12) from its equilibrium position toward its first closed position. Bleed holes (16) may be provided in the plug (12).

1 Claim, 5 Drawing Figures

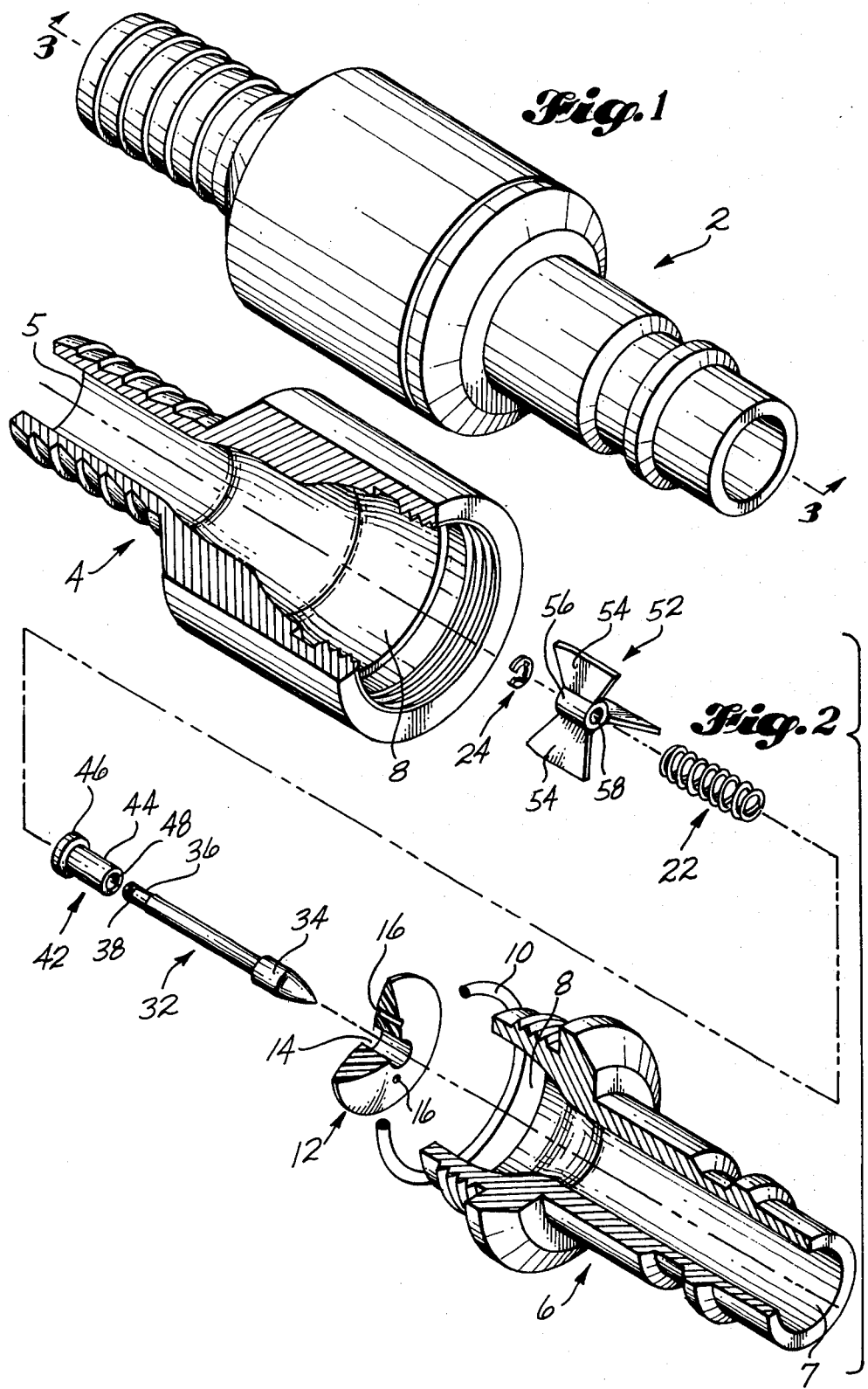

TWO-WAY FUSE FOR A FLUID LINE

TECHNICAL FIELD

This invention relates to two-way fuses for use in fluid lines and, more particularly, to a fuse that remains open under normal flow conditions and that closes when the flow becomes excessive and when there is flow in the direction opposite to the direction of normal flow.

BACKGROUND ART

This invention is directed toward the solution of two problems associated with the use and operation of pressurized air hoses. The first of these problems is excessive or uncontrolled air flow, resulting in a whipping action of the hose, when an air hose ruptures or is severed or is connected to an air source before the downstream end is connected to the device intended to be powered by the pressurized air. The second problem is the rapid spontaneous exhaust of air from the hose in the direction opposite to the direction of normal flow when the hose is being disconnected from a source of pressurized air. Both conditions are problems because the resultant motion of the hose can cause injury or damage to nearby persons and equipment.

There have been various attempts to solve the hose whipping problem by the use of pneumatic velocity valves. These attempts have been only marginally effective. Commercially available pneumatic velocity valves are generally large in size in relation to their function and are usually quite costly. In addition, since they must be plumbed directly into each coupling of a coupling bulkhead (a piping fixture that usually contains one or more female quick disconnect air hose couplings) and since each valve must be preset for use with a specific type of air hose coupling and air hose, the commercially available valves lack versatility. A given valve can only be used with the size air hose for which it is preset if the valve is to function properly. A valve that is set for a larger air hose, such as a three-quarter inch hose, will not function to cut off excessive flow through a smaller air hose, such as a one-half inch hose. The smaller hose cannot pass a large enough volume of air to actuate the flow check mechanism even though the volume of air passed is large enough to make the hose whip violently.

The commercially available pneumatic velocity valves may also be ineffective in preventing hose whipping when two or more hoses are connected in series. Such an arrangement of hoses limits the amount of air that can be passed by the connected hoses, and therefore, should the flow become excessive, there might not be a sufficient volume of air to actuate the flow check mechanism of the valve that is plumbed into the coupling.

Conventional methods for dealing with the problem of the rapid spontaneous exhaust of pressurized air when the hose is disconnected have also been only marginally effective. The common solution to the problem has been to use a "zero-pressure" quick disconnect air hose coupling. Such a coupling vents the pressurized air from the air hose before the hose can be removed from the coupling. In comparison to non-zero-pressure quick disconnect couplings, the zero-pressure quick disconnect couplings are generally larger, more costly, and more complicated to operate. In addition, they restrict the flow of air through the coupling during normal flow conditions more than non-zero-pressure quick disconnect couplings.

The following U.S. patents disclose valves for use in fluid lines:
- U.S. Pat. No. 701,754, granted June 3, 1902, to T. W. Moran;
- U.S. Pat. No. 1,466,171, granted Aug. 28, 1923, to O. Jacobsen;
- U.S. Pat. No. 2,454,480, granted Nov. 23, 1948, to D. Rossman;
- U.S. Pat. No. 2,623,725, granted Dec. 30, 1952, to A. D. Sands;
- U.S. Pat. No. 2,889,850, granted June 9, 1959, to W. C. Eberline;
- U.S. Pat. No. 3,017,871, granted Jan. 23, 1962, to J. T. McKiney;
- U.S. Pat. No. 3,085,589, granted Apr. 16, 1963, to A. D. Sands;
- U.S. Pat. No. 3,122,162, granted Feb. 25, 1964, to A. D. Sands;
- U.S. Pat. No. 3,326,233, granted June 20, 1967, to J. E. Perruzzi;
- U.S. Pat. No. 4,104,004, granted Aug. 1, 1978, to M. L. Graef; and
- U.S. Pat. No. 4,120,316, granted Oct. 17, 1978, to G. P. Robinson, Jr. et al.

For the most part, these patents are only of general interest and do not disclose valves that are closely related in function or structure to the two-way fuse of the present invention. However, three of the patents are more specifically related and will be discussed separately.

Sands U.S. Pat. No. 2,623,725 and Sands U.S. Pat. No. 3,085,589 each disclose a valve that has a main function of checking flow in the forward direction in the event of hose breakage. The first of these valves, U.S. Pat. No. 2,623,725, is designed to work in either one of two directions, but only in the forward flow direction. In order to have the valve operate in the opposite direction, the valve is turned around in the system, resulting in a different operating sensitivity. The second of these valves, U.S. Pat. No. 3,085,589, is disclosed to operate in the reverse, as well as the forward, direction. However, the valve is only described as operating in the reverse direction when there is excessive flow in the reverse direction; there is no discussion of the valve functioning when the hose is being disconnected. Both of the patents disclose a valve with a valve member that is balanced in a center position by two oppositely directed springs. Thus, any amount of flow in either direction will cause the valve member to move away from its center position and thereby cause some degree of restriction in the flow in that direction.

Perruzzi U.S. Pat. No. 3,326,233 discloses a valve that checks excessive flow in the forward direction and that closes off the flow path when there is flow in the reverse direction. The structure and functioning of the valve is based on the principal of the Venturi tube, and the valve is designed principally to operate in a vertical position.

The above patents and the prior art that is discussed and/or cited therein should be studied for the purpose of putting the present invention into proper perspective relative to the prior art.

DISCLOSURE OF THE INVENTION

The subject of this invention is a two-way fuse for use in a fluid line, such as an air hose used to connect a source of pressurized air to a pneumatic tool. According to a basic aspect of the invention, the fuse comprises a housing with an axial flow passageway that includes a bulbous chamber. This chamber is circular in cross section along its entire axial length. The chamber has a sidewall that is smoothly curved in the axial direction, an inlet end, and an outlet end. The cross-sectional diameters of the chamber increase in a smooth curve from a predetermined diameter at the inlet end to a maximum diameter at an axially intermediate portion of the chamber and decrease in a smooth curve from said maximum diameter at said intermediate portion to such predetermined diameter at the outlet end. The fuse also includes plug means comprising a circular plug that is concentric with the axis of the flow passageway and has a circumferential periphery with a maximum diameter substantially equal to said predetermined diameter. The plug means has a first closed position in which the periphery seats against the sidewall of the chamber at the outlet end, a second closed position in which the periphery seats against the sidewall at the inlet end, and an equilibrium position that is axially between said first and second closed positions and in which there is an annular flow passageway defined between the periphery and the sidewall. Spring means bias the plug means toward its equilibrium position. The fuse is provided with mounting means for mounting the plug means and the spring means in the housing and for guiding movement of the plug means in the axial direction between its equilibrium position and its first and second closed positions. The housing includes means for blending the sidewall of the chamber into the fluid line.

This basic structure solves the two problems, discussed above, associated with the use and operation of air hoses. First, the fuse of this invention acts as a pneumatic velocity fuse when the plug means is seated in its first closed position. This prevents excessive or uncontrolled air flow, and hose whipping caused by such air flow, should the air hose become severed, rupture, or be connected to an air source before the downstream end is connected to the device to be powered. Second, it acts as a check valve when the plug means is seated in its second closed position and thereby cuts off flow in the reverse direction from the normal direction of flow. This check valve action prevents the rapid spontaneous exhaust of the air in the hose when the hose is disconnected from the source of pressurized air. The fuse of this invention performs both of these functions, pneumatic velocity fuse and check valve, without there being any need for changing the configuration of the fuse with respect to the air supply system (such as turning the fuse around in the fluid line) and without there being any need to reset the fuse. In addition, the operation of the fuse is unaffected by the attitude in which the fuse is installed.

According to a preferred aspect of the invention, the circular plug comprises a disk with two convex sides meeting at a rounded circumferential periphery. A plug of this design offers minimal resistance (in its equilibrium position) to the flow of fluid through the flow passageway and can be used in a very compact housing.

According to another aspect of the invention, the spring means is positioned at the outlet end of the chamber and is preloaded to exert a force that opposes movement of the plug means from its equilibrium position toward its first closed position. The plug means is free to move toward its second closed position. The plug means is in its equilibrium position when there is a normal flow of fluid through the fluid line. The plug means moves from its equilibrium position to its first closed position when the flow becomes sufficiently excessive to overcome the force of the spring means. The plug means moves freely to its second closed position when there is flow of fluid in the fluid line in a direction opposite to the normal direction of flow.

When the spring means is preloaded to exert a force in the direction opposite to the normal direction of flow, the plug means is kept axially centered during increased flow rates until the flow rate becomes sufficiently excessive to produce enough force to overcome the force of the spring. When the flow rate reaches this magnitude, the plug means moves until it becomes seated in its first closed position. Because the plug means remains centered as the flow rate is increasing but is still within a normal range, there is no undesirable increase in resistance to flow in the normal direction of flow as long as the flow remains within the normal range. This maintenance of the plug means in its equilibrium position, combined with the aerodynamic design of the flow passageway through the housing (the smoothly curved sidewall), results in a highly efficient two-way fuse. During normal operating conditions when the plug means is in its equilibrium position, the air or other fluid flows through the flow passageway with minimal restriction of the flow and with minimum pressure drop along the flow passageway.

According to another aspect of the invention, the fuse further comprises bleed means for allowing fluid to seep, when the plug means is in one of its closed positions, out of the end of the chamber at which the plug means is seated and into the axial flow passageway. Preferably, the bleed means comprises at least one bleed hole extending through the circular plug substantially parallel to the axis of the axial flow passageway.

According to another aspect of the invention, the mounting means comprises a circular center hole extending axially through the plug, and a concentric rod that is received into the center hole and along which the plug slides axially. The spring means preferably comprises a coil spring with spirals through which the rod extends.

According to another aspect of the invention, the rod is cantilevered with a first end mounted and supported by the mounting means adjacent to the outlet end of the chamber, and a second free end projecting out through the inlet end of the chamber.

According to still another aspect of the invention, the means for blending the sidewall of the chamber into the fluid line comprises portions of the axial flow passageway. These portions form an inlet passageway and an outlet passageway, each of which is circular in cross section and has a sidewall that blends smoothly into the sidewall of the chamber at an inner end and into the fluid line at an outer end. Preferably, the housing includes a barbed end through which said outlet passageway extends and a coupling end through which said inlet passageway extends. The barbed end is sized to be received into a standard air hose. The coupling end is adapted to be secured to a standard hose coupling.

According to yet another aspect of the invention, the housing comprises two members that threadedly engage each other and that have inner sidewalls that blendingly meet along an axially intermediate circumference of the chamber.

The fuse of this invention has the advantages of being small in size, simple in construction, and inexpensive to manufacture. The structure of the fuse makes it possible to keep the fuse very near the same size as the male barbed hose ends that are now commonly in use and which do not incorporate any safety features. The small size and the simplicity of construction of the fuse make it possible to easily and inexpensively manufacture it and also make its use and operation relatively uncomplicated.

Another advantage of the structure of the fuse of this invention is that it results in a two-way fuse that is very versatile. The effectiveness of the safety features can easily be tailored to the particular situation in which the fuse is being used by the choice of the proper spring and plug means. In addition, when a particular situation calls for the connecting of two or more hoses in series, it is a simple matter to provide one fuse one for each length of hose in the series. This insures that, if there is a rupture or break in any one of the hose lengths, the fuse in that length will operate to prevent the development of a dangerous situation, such as hose whipping by either portion of the severed hose. The versatility of the fuse is further enhanced in the embodiments in which the housing is constructed of two members that threadedly engage each other. This construction allows the easy replacement of the hose end of the fuse or the quick changing of the spring or plug means in order to adjust the system for a different size hose or to respond to a different flow rate.

These and other advantages and features will become apparent from the detailed description of the best mode for carrying out the invention that follows.

BRIEF DESCRIPTION OF THE DRAWINGS

In the drawings, like element designations refer to like parts throughout and:

FIG. 1 is a pictorial view of a preferred embodiment of the fuse of this invention.

FIG. 2 is an exploded pictorial view of the fuse shown in FIG. 1, with foreground portions of the two housing parts, the disk, and the O-ring cut away.

BEST MODE FOR CARRYING OUT THE INVENTION

Figure 3:
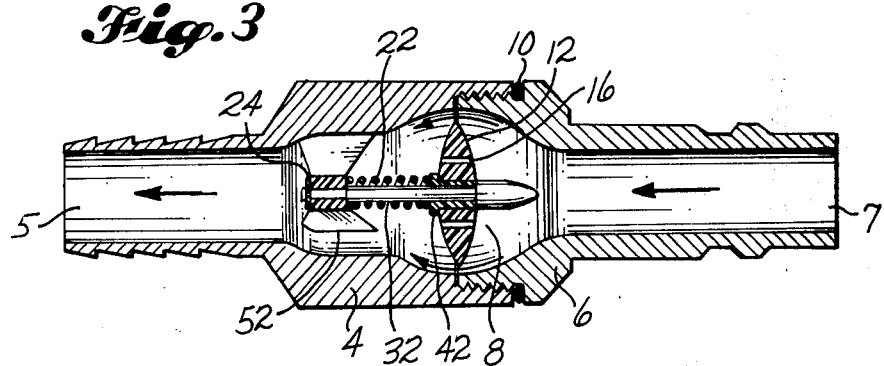
FIG. 3 is a cross-sectional view taken along the line 3—3 in FIG. 1 and showing the fuse with the disk in its equilibrium position.
Figure 4:
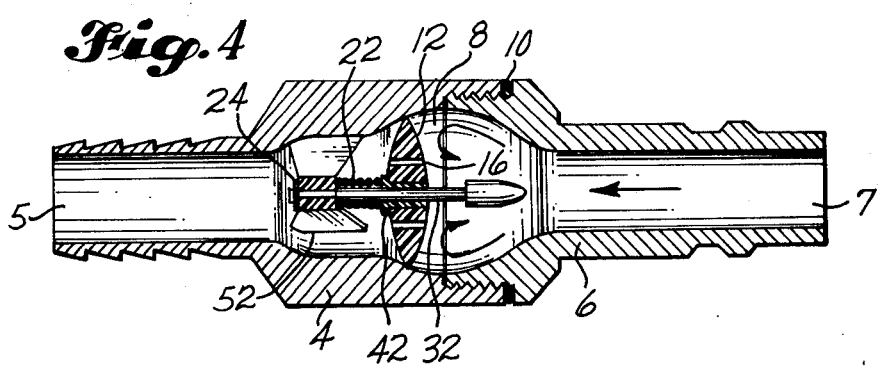
FIG. 4 is like FIG. 3 except that it shows the disk in its first closed position.
Figure 5:
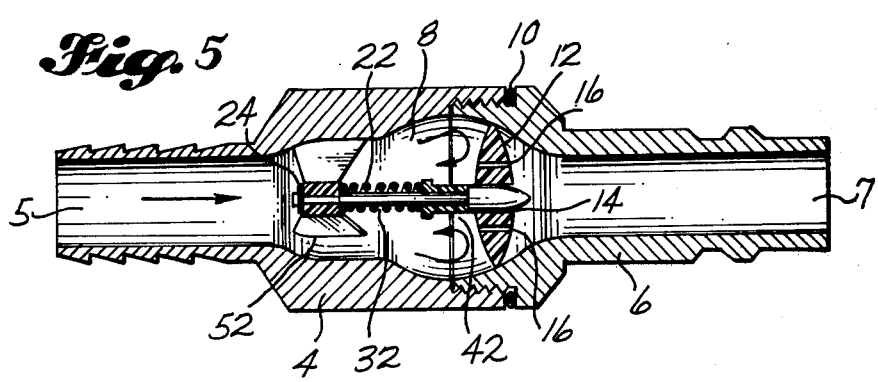
FIG. 5 is like FIG. 2 except that it shows the disk in its second closed position.

The drawings show a two-way fuse 2 that is constructed according to the invention and that also constitutes the best mode of the invention currently known to the applicant. The fuse 2 is designed to be used in a fluid line, such as an air hose that connects a source of pressurized air to a pneumatic tool.

The fuse 2 has a housing 4, 6 with an axial flow passageway that includes a bulbous chamber 8 defined between an inlet end and an outlet end. As shown in the drawings, the housing 4, 6 preferably is constructed from two members. Each of these members has a wide end that defines a portion of the bulbous chamber 8 and a narrow end. The outer portions of the wide ends have complimentary threads so that the two members can be detachably connected to form the assembled housing 4, 6 of the fuse 2. A circumferential O-ring 10 may be provided between said outer portions to ensure a good seal. When the two members are so connected, their inner sidewalls meet along an axially intermediate circumference of the chamber 8 and blend together to form the smooth inner sidewall of the chamber 8. Of course, the two members could be connected together in some other manner, such as by a circumferential weld, but the detachable threaded connection is preferred.

The chamber 8 is circular in cross section along its entire axial length. The sidewall of the chamber 8 is smoothly curved in the axial direction from the inlet end of the chamber 8 to the outlet end. The cross-sectional diameters of the chamber 8 increase in a smooth curve from a predetermined diameter at the inlet end to a maximum diameter at an axially intermediate portion of the chamber 8. The cross-sectional diameters then decrease in a smooth curve from this maximum diameter at said intermediate portion of the chamber 8 to the same predetermined diameter at the outlet end of the chamber 8.

A circular valve plug is positioned in the chamber 8 to move axially between an intermediate equilibrium position and first and second closed positions. In the preferred embodiment, the valve plug is a disk 12 with two convex sides that meet at a rounded circumferential periphery. The disk 12 is positioned to be concentric with the axis of the axial flow passageway of the housing 4,6. The disk 12 has a maximum diameter that is substantially equal to the predetermined diameter at the inlet and outlet ends of the chamber 8. When the disk 12 is in its first closed position, its periphery seats against the sidewall of the chamber 8 at the chamber's outlet end; and when the disk 12 is in its second closed position, its periphery seats against the sidewall of the chamber 8 at the chamber's inlet end. When the disk 12 is between its first and second closed positions, there is no contact between its periphery and the sidewall of the chamber 8. More specifically, when the disk 12 is in its equilibrium position, an annular flow passageway is defined between the periphery of the disk 12 and the sidewall of the chamber 8.

The fuse 2 is preferably provided with spring means that resist movement of the disk 12 from its equilibrium position toward its first closed position, with the disk 12 being free to move toward its second closed position. As can be seen in the drawings, in the preferred embodiment the spring means is a coil spring 22 that is positioned at the outlet end of the chamber 8. The spring 22 is preloaded to exert a force that opposes movement of the disk 12 from its equilibrium position toward its first closed position. "Preloaded", as used in this description, means that the spring 22 is partially compressed when the disk 12 is being held in its equilibrium position by the spring 22. This preloading results in the disk 12 being held in its equilibrium position when there is a normal flow of fluid through the fluid line, with the disk 12 moving from its equilibrium position to its first closed position only when the flow becomes sufficiently excessive to overcome the force of the spring 22. Since the disk 12 is free to move toward its second closed position, a flow of fluid in the fluid line of essentially any magnitude in the direction opposite to the normal direction of flow will cause the disk 12 to seat in its second closed position.

The disk 12 preferably is provided with a plurality of bleed holes 16 spaced circumferentially about its axis. In the preferred embodiment shown in the drawings, there are two such bleed holes 16 spaced 180 degrees apart. These bleed holes 16 allow a small amount of air to pass through the disk 12 when the disk 12 is seated in its first closed position. The passage of this small amount of air in turn allows the disk 12 to be automatically reset by the force of the spring 22 when the excessive flow condition is corrected. The bleed holes 16 also have a second function. When the air hose is uncoupled, the disk 12 moves freely to seat itself in its second closed position. This checks any rapid spontaneous exhaust of air, and the bleed holes 16 then allow the air to exhaust at a much slower rate.

The disk 12 and the spring 22 are mounted in the housing 4,6 by mounting means that preferably engage a central portion of the disk 12. In the preferred embodiment shown in the drawings, the mounting means includes a circular center hole 14 that extends axially through the disk 12, and a concentric rod 32 that is received into the center hole in the disk 12 and along which the disk 12 slides axially. The rod 32 guides the movement of the disk 12 in the axial direction between its equilibrium position and its first and second closed positions. The spring is preferably a coil spring 22 that has spirals through which the rod 32 extends. As shown in the drawings, the rod 32 is preferably cantilevered and has a first end that is mounted and supported adjacent to and just outside the outlet end of the chamber 8 and a second free end that projects out through the inlet end of the chamber 8. The rod 32 and the spring 22 are mounted in the housing 4, 6 by means of a spider 52. The spider 52 includes a hub 56 to which the rod 32 is secured and a plurality of spoke members 54. As shown in the drawings, in the preferred embodiments there are three spoke members 54 spaced circumferentially 120 degrees apart. The spider 52 is press-fitted into the axial flow passageway of the housing 4, 6 with the outer edges of the spoke members 54 pressed against the sidewall of the passageway.

One of the advantages of this mounting arrangement is that it provides a simple means of mounting the spring 22 in a preloaded condition. To preload the spring 22, the rod 32 is provided with a circumferential shoulder that is formed by an enlarged diameter portion 34 of the rod 32 at the free end of the rod 32. In addition, a T-shaped positioner 42, having a longitudinal shaft 44, a flat circular head 46, and a longitudinal passageway 48 extending concentrically through the shaft 44 and the head 46, is positioned with the rod 32 being received into the longitudinal passageway 48. When the disk 12 is in its equilibrium position, the shaft 44 of the T-shaped positioner 42 abuts against the shoulder on the rod 32, the head 46 of the positioner 42 abuts against the spring 22 to preload the spring 22, and the circular hole 14 in the center of the disk 12 slidingly receives the shaft 44.

In the preferred embodiment, the sidewall of the chamber 8 is blended smoothly into the fluid line via portions of the axial flow passageway of the housing 4, 6, which portions form an inlet passageway 7 and an outlet passageway 5. Each of these inlet and outlet passageways 7, 5 are circular in cross section and have a sidewall that blends smoothly into the sidewall of the chamber 8 at an inner end and into the fluid line at an outer end. To facilitate the mounting of the disk 12, spring 22, and rod 32, the outlet passageway 5 has an inner portion and an outer portion, with the diameter of the inner portion being less than said predetermined diameter but more than the diameter of the outer portion. The spider 52 is press fitted into the inner portion of the outlet passageway 5. Although the transition from the larger diameter of the inner portion to the smaller diameter of the outer portion is relatively gradual, that is the diameter changes in a smooth curve rather than at a sharp angle, the difference in the diameters nevertheless provides additional security for retaining the spider 52 and the fuse elements that are mounted on it in their proper places within the housing 4, 6.

The spider 52 may be secured to the rod 32 in a number of conventional ways. In the preferred embodiment shown in the drawings, the end of the rod 32 that is secured to the hub 56 has a reduced diameter 36. The hub 56 has a concentric axial hole 58 extending therethrough into which the reduced diameter 36 of the rod 32 is received and which has a diameter approximately equal to the reduced diameter 36. When the rod 32 is placed into the hole 58 in the hub 56 of the spider 52, the inner end of the hub 56 abuts against a shoulder formed by the central portion of the rod 32 adjacent to the reduced diameter portion 36. The tip of the rod 32 extends out through the outer end of the hub 56. The tip of the rod 32 is provided with a circumferential groove 38 into which a conventional snap ring or clip 24 is received. Thus, the rod 32 is securely attached to the spider 52, and the rod 32 is prevented from sliding axially out of position because the hub 56 of the spider 52 is held in its axial position between the snap ring 24 and the shoulder formed by the junction of the reduced diameter 36 and the central diameter portions of the rod 32.

For ease of installation, the housing 4, 6 is preferably provided with a barbed end 4 through which the outlet passageway 5 extends and a coupling end 6 through which the inlet passageway 7 extends. The barbed end 4 is sized to be received into a standard air hose, with the entire fuse 2 being not much larger than a standard male barbed hose end. The coupling end 6 is adapted to be secured to a standard hose coupling. As discussed above, the housing also preferably is constructed of two members. One of these members includes a portion of the bulbous chamber 8 and the barbed end 4. The other of these members includes another portion of the chamber 8 and the coupling end 6.

The assembly of the fuse 2 of this invention is quite simple. First the positioner 42 is slid over the reduced diameter end 36 of the rod 32, shaft end first. The positioner 42 is slid over the intermediate diameter at the center of the rod 32 and up to the shoulder formed by the enlarged diameter portion 34 of the rod 32 at the free end of the rod 32. The shaft 44 of the positioner 42 then abuts against this shoulder. When the positioner 42 is in place, the spring 22 is then slid onto the rod 32 up to the positioner 42. Then the spider 52 is slid onto the rod 32 and moved against the spring pressure until the inner end of the hub 56 of the spider 52 abuts the shoulder formed between the reduced diameter portion 36 of the rod 32 and the center intermediate diameter portion of the rod 32. The tip of the reduced diameter end 36 of the rod 32 is then protruding slightly beyond the outer end of the hub 56 of the spider 52. To complete the assembly of the parts on the rod 32, the snap ring 24 is then snapped into the groove 38 provided in the protruding tip of the rod 32. With the snap ring 24 in place, the positioner 42, spring 22, and spider 52 are held in position on the rod 32. The rod 32 and the parts assembled thereon are then installed in the housing 4, 6 by press-fitting the spider 52 in the inner portion of the outlet passageway 5 of the housing 4, 6 with the free end of the rod 32 oriented in the direction opposite to the direction of normal flow. Next, the disk 12 is slid over the free end of the rod 32. The disk 12 moves freely over the enlarged diameter portion 34 at the free end of the rod 32 and over the shaft 44 of the positioner 42, and the downstream convex side of the disk 12 rests against the inner flat face of the head 46 of the positioner 42. With these parts thus assembled, all that remains is to screw the two members of the housing 4, 6 together. This completes the assembly process.

The operation of the fuse 2 is simple but highly efficient. Under normal flow conditions, the flow of air or other fluid passes around the disk 12 through the annular flow passageway formed between the periphery of the disk 12 and the sidewall of the chamber 8. The disk 12 is kept centered by the positioner 42 and the spring 22. The disk 12, in effect, "flies" in the oncoming flow because the fluid pressure of the fluid flow is equalized all around the periphery of the disk 12. In other words, the disk 12 finds its aerodynamic center. This centering of the disk 12 ensures greater freedom of movement of the disk 12 because it has an inherent tendency to remain balanced in the flow system so as not cock one way or the other on the rod 32. Thus, the disk 12 slides freely on the rod 32 with a minimum amount of resistance other than the force exerted by the spring 22.

When there is excessive flow along the flow passageway, whether due to a severing or rupturing of the air hose or some other cause, the force of the moving air on the anterior side of the disk 12, combined with the force on the posterior side of the disk 12 caused by the drop in pressure of the moving air, causes the disk 12 to move against the spring force and seat itself in its first closed position to close the flow passageway. As discussed above, the bleed holes 16 then allow the disk 12 to reestablish itself in its equilibrium position when the cause of the excessive flow has been remedied.

Also as described above, the disk 12 seats itself in its second closed position whenever there is a flow of fluid in the direction opposite to the normal flow direction. Because of the aerodynamic radial centering of the disk 12, the disk 12 is free to move toward its second closed position. Therefore, essentially any amount of flow in the reverse direction will seat the disk 12 in its second closed position.

The fuse 2 of this invention is small in size and simple in construction and, therefore, is relatively easy and inexpensive to manufacture. The fuse 2 also has the advantage of being very versatile. There is a certain amount of interchangeability of parts; that is, for example, a three-quarter inch coupling end 6 can be combined with either a three-quarter inch hose end 4 or a one-half inch hose end 4. The versatility is increased by the capability of the fuse 2 to be installed on every hose section when two or more hose sections are connected in series.

The fuse 2 of this invention is also very durable. The fuse 2 can take a reasonable amount of pounding or misuse without suffering damage. When the unit is subjected to such pounding or misuse, the disk 12 is "free" enough to be able to touch the sides of the housing 4, 6 and thereby provide support for the rod 32. Nevertheless, the disk 12 will center itself when it is again subjected to a flow condition.

The fuse 2 as a whole is designed aerodynamically to minimize pressure drops along the flow passageway. The sidewalls of the flow passageway through the housing 4, 6 are all smoothly curved, and there are no sharp changes in the diameters of the flow passageway. Such sharp changes would cause relatively sharp changes in pressure along the passageway and would also create undesirable turbulence in the flow of the fluid. The aerodynamic design of the flow passageway, combined with the aerodynamic characteristics of the disk 12, result in a fuse 2 that operates smoothly and efficiently with a minimum of restriction of or interference with the flow of the fluid through the fluid line.

The various parts of the fuse 2 may be made from a variety of materials. Preferably, the disk 12, spider 52, and T-shaped positioner 42 are made from a light strong plastic, with the other parts being metal. This results in a strong, lightweight, and durable fuse.

Although the preferred embodiment of this invention has been illustrated and described, it is to be understood that various modifications may be made without departing from the spirit and scope of the present invention as defined in the following claims.

I claim:

1. A two-way fuse for use in a fluid line, comprising:
  a housing with an axial flow passageway that includes a bulbous chamber; said chamber being circular in cross section along its entire axial length; and said chamber having a sidewall that is smoothly curved in the axial direction, an inlet end, an outlet end, and cross-sectional diameters that increase in a smooth curve from a predetermined diameter at the inlet end to a maximum diameter at an axially intermediate portion of the chamber and that decrease in a smooth curve from said maximum diameter at said intermediate portion to said predetermined diameter at the outlet end;
  plug means comprising a circular plug that is concentric with the axis of the flow passageway and that has a circumferential periphery with a maximum diameter substantially equal to said predetermined diameter; said plug means having a first closed position in which said periphery seats against the sidewall of the chamber at the outlet end, a second closed position in which said periphery seats against said sidewall at the inlet end, and an equilibrium position that is axially between said first and second closed positions and in which there is an annular flow passageway defined between said periphery and said sidewall;
  spring means for biasing the plug means toward its equilibrium position; said spring means resisting movement of the plug means from its equilibrium position toward its first closed position; and said plug means being free to move toward its second closed position; and
  mounting means for mounting the plug means and the spring means in the housing and for guiding movement of the plug means in the axial direction between its equilibrium position and its first and second closed positions;
  wherein said housing includes means for blending said sidewall of the chamber into the fluid line;
  wherein the spring means is positioned at said outlet end and is preloaded to exert a force that opposes movement of the plug means from its equilibrium position toward its first closed position; said plug means being in its equilibrium position when there is a normal flow of fluid through the fluid line, said plug means moving from its equilibrium position to its first closed position when the flow becomes sufficiently excessive to overcome the force of the spring means, and said plug means moving freely to its second closed position when there is flow of fluid in the fluid line in a direction opposite to the normal direction of flow;

wherein the mounting means comprises a circular center hole extending axially through the plug; a T-shaped positioner having a longitudinal shaft, a flat circular head, and a longitudinal passageway extending concentrically through the shaft and the head; and a concentric rod that is received into said center hole and said longitudinal passageway and along which the plug slides axially;

wherein the spring means comprises a coil spring with spirals through which the rod extends;

wherein the rod has a circumferential shoulder thereon, formed by an enlarged diameter portion of the rod; and wherein when the plug means is in its equilibrium position, the shaft abuts against the shoulder, the head abuts against the coil spring to preload said spring, and the center hole in the plug slidingly receives the shaft.

* * * * *